United States Patent
Yokoyama et al.

(10) Patent No.: US 6,593,951 B2
(45) Date of Patent: Jul. 15, 2003

(54) OPTICAL WRITING SYSTEM DIRECTED TO MINIATURIZATION THEREOF, AND IMAGE FORMING APPARATUS EMPLOYING IT

(75) Inventors: Masato Yokoyama, Kanagawa (JP); Hiroshi Yoshizawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 35 days.

(21) Appl. No.: 09/956,900

(22) Filed: Sep. 21, 2001

(65) Prior Publication Data
US 2002/0036683 A1 Mar. 28, 2002

(30) Foreign Application Priority Data

Sep. 25, 2000 (JP) ......................................... 2000-290678
Nov. 7, 2000 (JP) ......................................... 2000-339215

(51) Int. Cl.[7] ........................... B41J 2/385; B41J 2/435; G03G 13/04; G01D 15/06
(52) U.S. Cl. ........................ 347/138; 347/118; 347/134; 347/137; 347/257; 347/258; 347/263
(58) Field of Search ................................. 347/118, 134, 347/137, 138, 152, 230, 231, 242, 243, 244, 245, 256, 257, 258, 259, 260, 263

(56) References Cited

U.S. PATENT DOCUMENTS 4,779,944 A * 10/1988 Ritter et al. ................. 347/138
5,351,070 A * 9/1994 Hinton et al. ................ 347/244
6,052,211 A * 4/2000 Nakajima .................... 347/243
6,075,636 A   6/2000 Sekikawa
6,137,614 A * 10/2000 Endoh ......................... 347/245
6,330,020 B1 * 12/2001 Kamioka ..................... 347/256

FOREIGN PATENT DOCUMENTS

JP            3-33712           2/1991

* cited by examiner

Primary Examiner—Susan S.Y. Lee
(74) Attorney, Agent, or Firm—Oblon, Spivak, McClelland, Maier & Neustadt, P.C.

(57) ABSTRACT

Optical systems are disposed in the two symmetrical direction with respect to an optical deflector, and direct the optical beams deflected by the optical deflector into respective surfaces to be scanned, and forming images thereon. A housing encloses a plurality of light sources, optical deflector and optical systems, the housing includes a base plate on which the optical deflector and optical system, and a side wall surrounding the base plate; the base plate divides the housing into two sections; the plurality of light sources are disposed on the side wall; and optical components of the optical systems are distributed into the two sections of the housing.

37 Claims, 12 Drawing Sheets

OPTICAL WRITING SYSTEM DIRECTED TO MINIATURIZATION THEREOF, AND IMAGE FORMING APPARATUS EMPLOYING IT

BACKGROUND OF THE INVENTION

1. Field of the Invention

The present invention generally relates to an optical writing system and an image forming apparatus, and, in particular, to an optical writing system directed to miniaturization thereof, and an image forming apparatus employing the thus-miniaturized optical writing system.

Further, the present invention relates to an image forming apparatus, such as a copying machine, a printer, a facsimile, or a plotter, which includes an optical writing device which applies an optical beam on to-be-scanned surfaces of a plurality of image carrying bodies disposed in parallel, and thus writes latent images thereon, respectively. The image forming apparatus then forms a multi-color image using the thus-formed respective latent images.

2. Description of the Related Art

In the related art, for example, four image carrying bodies (for example, photosensitive drums) installed to be exposed by optical beams emitted from a plurality of light sources. Thereby, latent images are written on the respective image carrying bodies. Then, these latent images are developed by developers of different colors (for example, toners of yellow, magenta, cyan and black). After the development and thus, visible images (toner images) are formed, these images are transferred onto a transfer medium, such as a record paper supported by a transfer conveyance belt etc, from the respective image carrying bodies, one by one, at respective transfer parts thereof. After laying the visible image of each color formed on each image carrying body on top of each other, onto the transfer medium and thus transferring it thereonto in a superimposing manner, the thus-formed multi-color image on the transfer medium is fixed thereonto, and, thus, a multi-color printed image is obtained. Such an image forming apparatus will be referred to as a tandem color image forming apparatus.

Although, in such a tandem color image forming apparatus, in some case, an optical writing device is provided separately for each image carrying body onto which a latent image is written individually. However, an optical writing device using an optical deflector which includes a polygon mirror and its motor for a drive is comparatively expensive, and to provide an optical writing device individually for every image carrying body has a problem in respect of costs of respective parts/components and/or manufacture costs of the entire image forming apparatus. Moreover, since an installation space required should be large in order to install a plurality of optical writing devices each having an optical deflector corresponding to the number of image carrying bodies, there is also a problem in that the entire image forming apparatus becomes large-sized.

Then, in order to attain effective reduction in the cost of such a tandem color image forming apparatus, and miniaturization thereof, an optical writing device has an optical deflector receiving optical beams applied by a plurality of light sources, carries out deflection of the optical beams applied by the plurality of light sources and thereby scanning a plurality of image carrying bodies. Thus, the single optical deflector simultaneously performs optical writing onto the plurality of image carrying bodies.

In the optical writing device which carries out deflection and scanning by the optical beams from the plurality of light sources with one optical deflector simultaneously on the plurality of image carrying bodies, and performs optical writing, an optical system which directs a plurality of optical beams and form images onto the respective image carrying bodies are arranged symmetrically in two directions with respect to the optical deflector. However, since the optical system includes a large number of optical components corresponding to the plurality of optical beams, miniaturization of the optical writing device would be difficult.

SUMMARY OF THE INVENTION

The present invention has been devised in consideration of the above-mentioned situation, and, an object of the present invention is to provide an image forming apparatus including an optical writing device, wherein a configuration/structure of a housing of the optical writing device and a configuration/arrangement of optical system are such as that enabling further miniaturization of the optical writing device.

An optical writing device according to the present invention includes:

a plurality of light sources;

an optical deflector deflecting optical beams generated by the plurality of light sources in two symmetrical directions;

optical systems disposed in the two symmetrical directions with respect to the optical deflector, and directing the optical beams deflected by the optical deflector into respective surfaces to be scanned, and forming images thereon; and a housing containing the plurality of light sources, optical deflector and optical systems, wherein:

the housing comprises a base plate on which the optical deflector and optical system are disposed, and a side wall part surrounding the base plate;

the base plate divides the housing into two sections;

the plurality of light sources are disposed on the side wall part;

the optical deflector is disposed approximately at the center of said base plate; and optical components of the optical systems are distributed into the two sections of the housing.

Thus, the optical writing device includes the plurality of light sources, the optical deflector which distributes the optical beams from these light sources and deflects them in the symmetrical two directions, the optical systems arranged symmetrically corresponding to the above-mentioned two directions with respect to the optical deflector and direct the thus-deflected four optical beams onto the respective to-be-scanned surfaces. Further, in the optical writing device, the plurality of light sources, optical deflector, and optical systems are arranged in the single housing. Further, in this optical writing device, the housing includes the base plate on which the above-mentioned optical deflector and optical systems are arranged, and the side wall part having the shape of the frame surrounding the circumference of this base plate. The above-mentioned base plate is provided in the approximately central portion of the above-mentioned side wall part, and divides the housing vertically. Further, the above-mentioned light sources are provided on the side wall part of the above-mentioned housing, the above-mentioned optical deflector is disposed in the approximately central part of the above-mentioned base plate, the optical components of the optical systems are distributed on the top and bottom sides of the base plate. Thereby, the miniaturization of the optical writing device can be attained with securing the necessary light path length of the whole optical system.

An optical writing device according to another aspect includes:

a light source unit;

an optical deflector deflecting a optical beam generated by the source unit;

an optical system directing the optical beam deflected by the optical deflector into a surface to be scanned, and forming an image thereon; and a housing containing the light source unit, optical deflector and optical system, wherein:
the housing comprises a base plate on which the optical deflector and optical system, and a side wall part surrounding the base plate;
the base plate divides the housing into two sections;
the light source unit is disposed on the side wall part; and
optical components of the optical system are distributed into the two sections of the housing.

The housing may be such that the base plate and side wall part are formed by integral resin molding; and the housing has an approximately H-shaped sectional view.

Thus, since the above-mentioned housing including the base plate and side wall part is made by resin integral molding, and has the H-shaped sectional view, while miniaturization of the housing can be achieved, the strength thereof can be secured, and vibration by rotation of the optical deflector etc. can be effectively controlled, and the optical characteristic/performance thereof can be maintained. Moreover, since the housing is made of resin formed by molding, the weight can be made small, any post-processing is thus unnecessary, thereby productivity is high, and the manufacture cost can be held down.

The housing may be formed of a resin material having an expansivity smaller than that of a frame of an image forming apparatus body to which the optical writing device is mounted.

Thus, since the expansivity of the frame of the image forming apparatus body to which the housing of the optical writing device is mounted and the expansivity of the housing are close although the housing is made of resin, distortion of the housing of the optical writing device due to temperature change etc. is not likely to occur, and thus the above-mentioned housing can maintain the optical characteristic of the optical writing device, in the state in which the housing of the optical writing device is fixed to the frame of the image formation apparatus body.

An image forming apparatus according to the present invention includes:

a plurality of image carrying bodies disposed side by side;

the above-described optical writing device writing latent images onto the plurality of image carrying bodies by applying the optical beams thereto, respectively;

a developing unit developing the latent images formed on the plurality of image carrying bodies and visualizes them; and a transfer unit carrying transfer material at positions of the respective image carrying bodies, and transferring the thus-visualized images of respective color components onto the transfer material from the respective image carrying bodies, one by one.

Thus, the plurality of image carrying bodies, the optical writing device which apples the optical beams and writes latent images on the respective to-be-scanned surfaces of the image carrying bodies, the development unit developing and forming visible images from the latent images formed on the respective image carrying bodies by developers of respective different color components, a unit which conveys transfer material (paper) and lays the visible images of respective color components onto the conveyed transfer material (paper) one by one at the positions of the respective image carrying bodies on top of each other, and thus transfers them, and a unit which fixes the thus-formed multi-color image formed on the transfer material (paper) thereto. In this configuration, since the above-described compact-sized optical writing device is employed, it is possible to provide a miniaturized, inexpensive, tandem full-color image forming apparatus.

Such an optical writing device as that described above may include an optical system including an optical scanning lens which comprises:

a lens part converging the deflected beam, deflected in a predetermined range, onto the surface to be scanned;

a reinforcement part reinforcing the lens part; and at least one standing wall projecting from either one of both ends along the longitudinal direction of the lens part in a beam exit direction, wherein the lens part, reinforcement part and at least one standing wall are formed integrally; and an angle θ2 of an inner surface of the at least one standing wall with respect to an optical axis of the lens part is larger than an angle θ1 of the deflected beam at the end of the lens part and the optical axis of the lens part.

Thereby, distortion and deformation of the lens part can be avoided by the integrally formed reinforcement part, the deflected beam passing through the end part of the lens part can be prevented from being reflected by the standing wall, and, thus, the end part of the effective scanning range can be prevented from being abnormally high in luminous energy, and, thus, generation of abnormality in a resulting printed image can be effectively prevented.

Such an optical writing device as that described above may instead include an optical system including an optical scanning lens which comprises:

a lens part converging the deflected beam, deflected in a predetermined range, onto the surface to be scanned;

a reinforcement part reinforcing the lens part; and at least one standing wall projecting from either one of both ends along the longitudinal direction of the lens part in a beam exit direction, wherein the lens part, reinforcement part and at least one standing wall are formed integrally; and an inner surface of the at least one standing wall is inclined with respect to a plane perpendicular to a deflection plane formed by the deflected beam incident on the lens part being deflected by the optical deflector.

Thereby, distortion and deformation of the lens part can be avoided by the integrally formed reinforcement part, the deflected beam passing through the end part of the lens part and even being reflected by the standing wall can be caused to be directed apart from the deflection plane, and, thus, the end part of the effective scanning range can be prevented from being abnormally high in luminous energy, and, thus, generation of abnormality in a resulting printed image can be effectively prevented.

An incident surface of the lens part may include a concave surface including a toroidal surface. In this configuration, the toroidal lens can be prevented from being distorted or deformed, by the reinforcement part, and, also, the problems occurring due to reflection of the deflected beam by the standing wall can be avoided as described above for the toroidal lens.

An image forming apparatus according to another aspect of the present invention includes:

the above-described optical scanning lens, disposed so as to face a surface to be scanned; and an optical deflector deflecting a laser beam so as to cause it to scan the surface to be scanned through the optical scanning lens.

Thereby, in the image forming apparatus, the optical scanning lens can be prevented from being distorted or deformed, by the reinforcement part, and, also, the problems occurring due to reflection of the deflected beam by the standing wall of the optical scanning lens can be avoided as described above.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

Hereafter, a configuration of an optical writing device according to the present invention and an image forming apparatus employing it, and operations/functions thereof will be described in detail in embodiments thereof with reference to figures.

Figure 1:
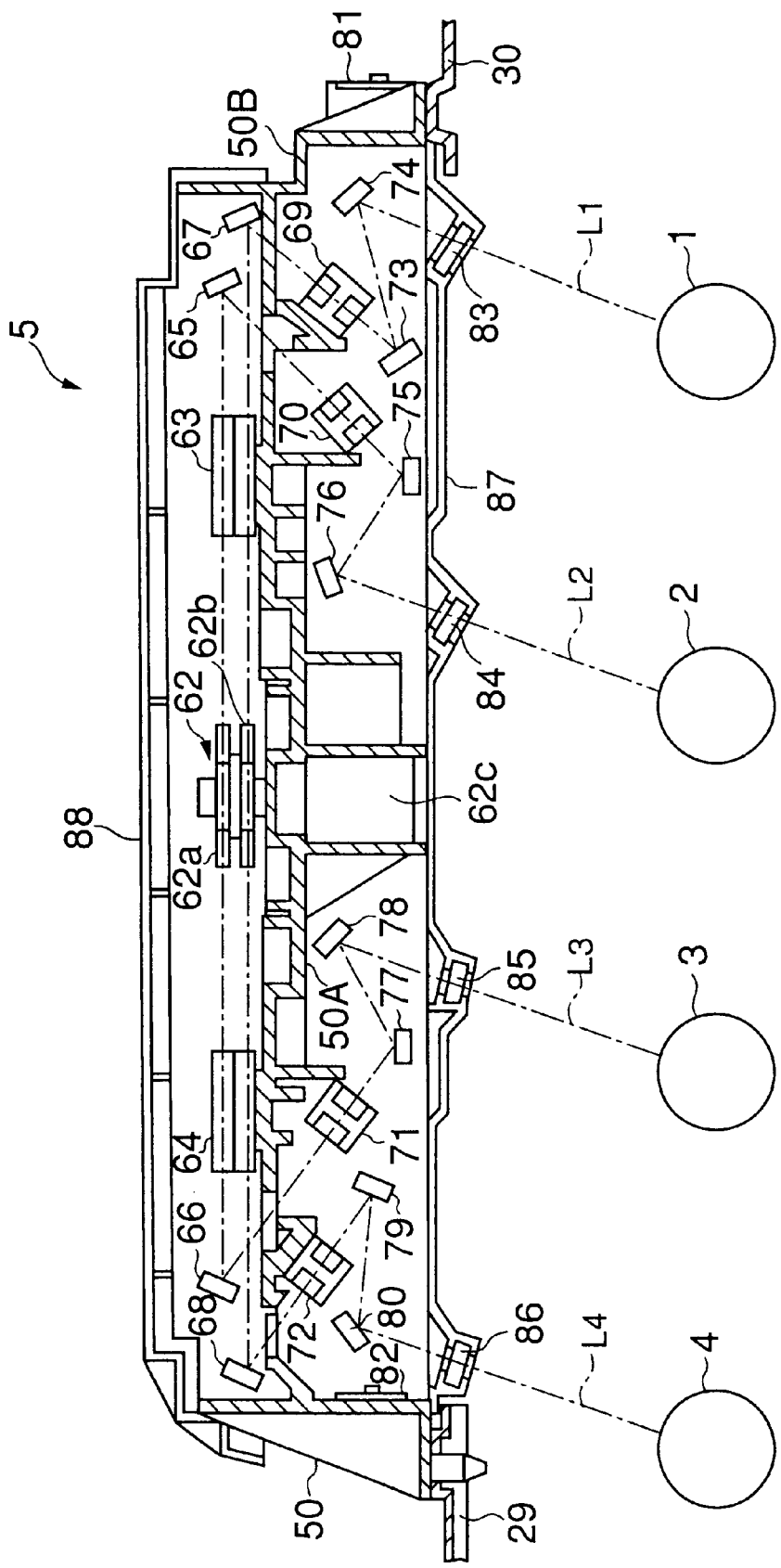
FIG. 1 shows a side elevational sectional view of an optical writing device in a first embodiment of the present invention.
Figure 2:
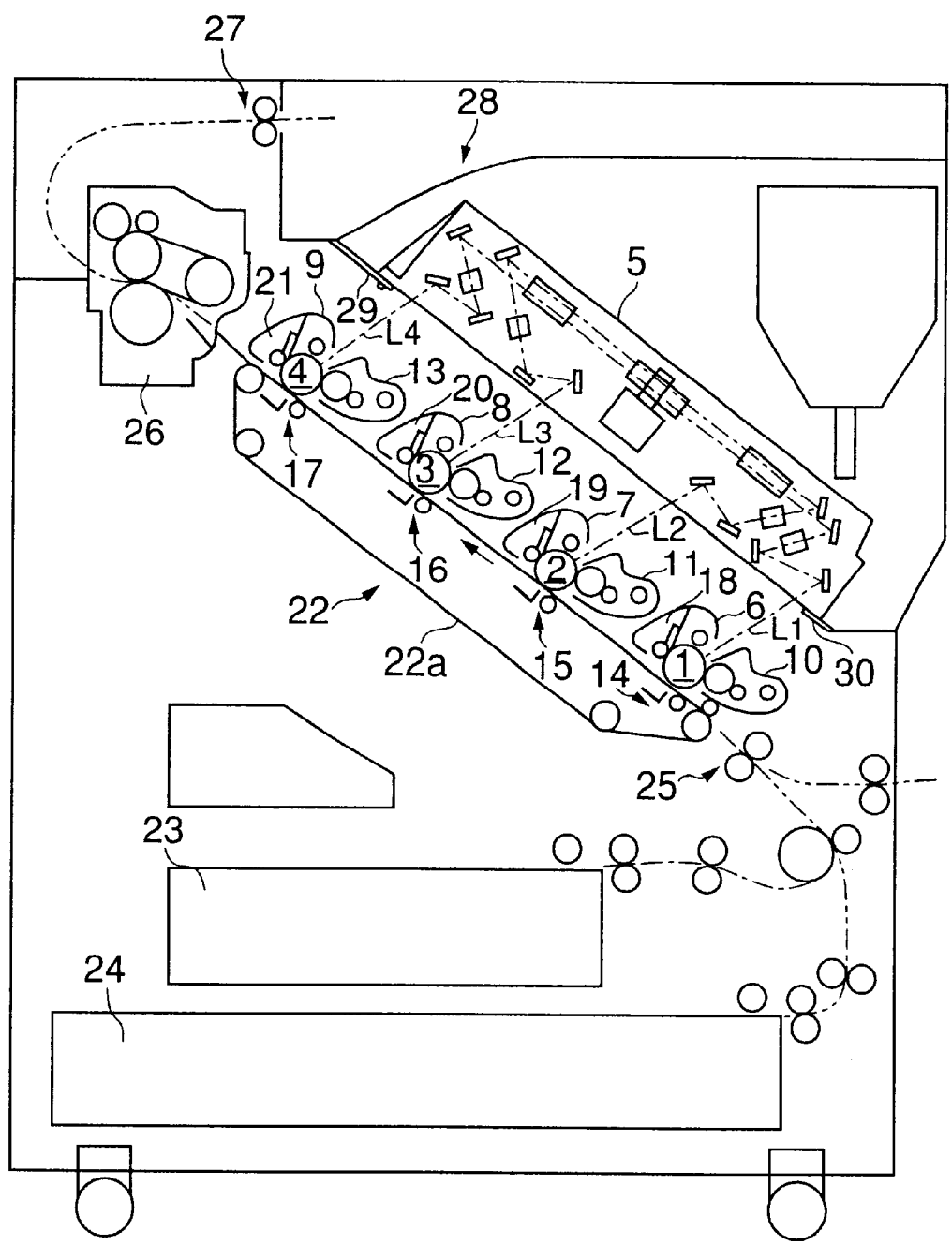
FIG. 2 shows a side elevational sectional view of an image forming apparatus in the first embodiment of the present invention employing the optical writing device shown in FIG. 1.
Figure 3:
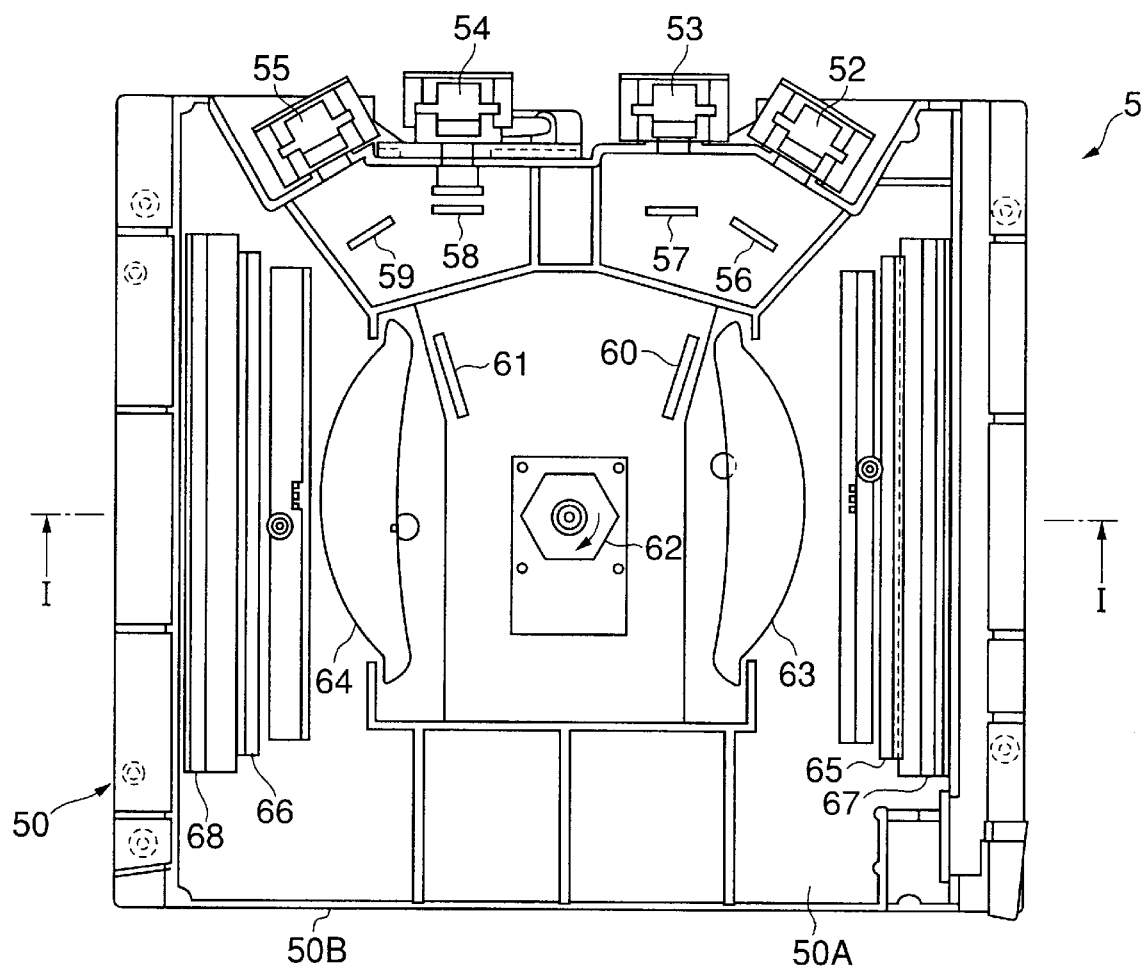
FIG. 3 shows a plan view illustrating a configuration of the optical writing device shown in FIG. 1 on a top side of a base plate of a housing.
Figure 4:
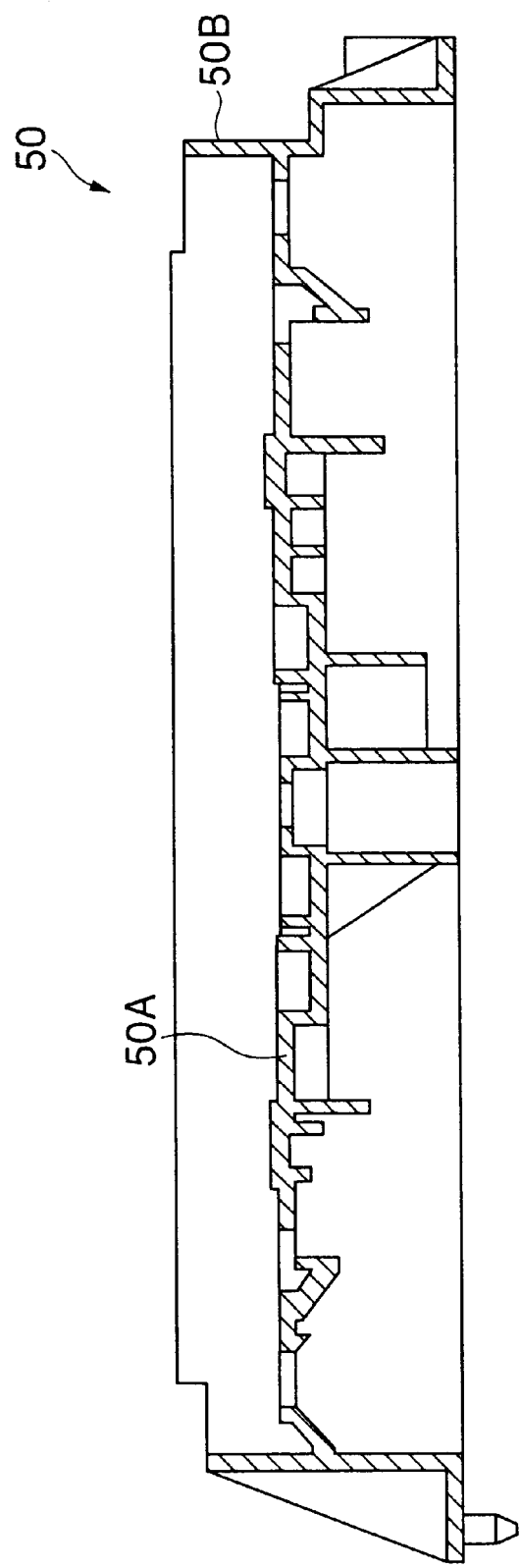
FIG. 4 shows a side elevational view of the housing of the optical writing device shown in FIG. 1.
Figure 5:
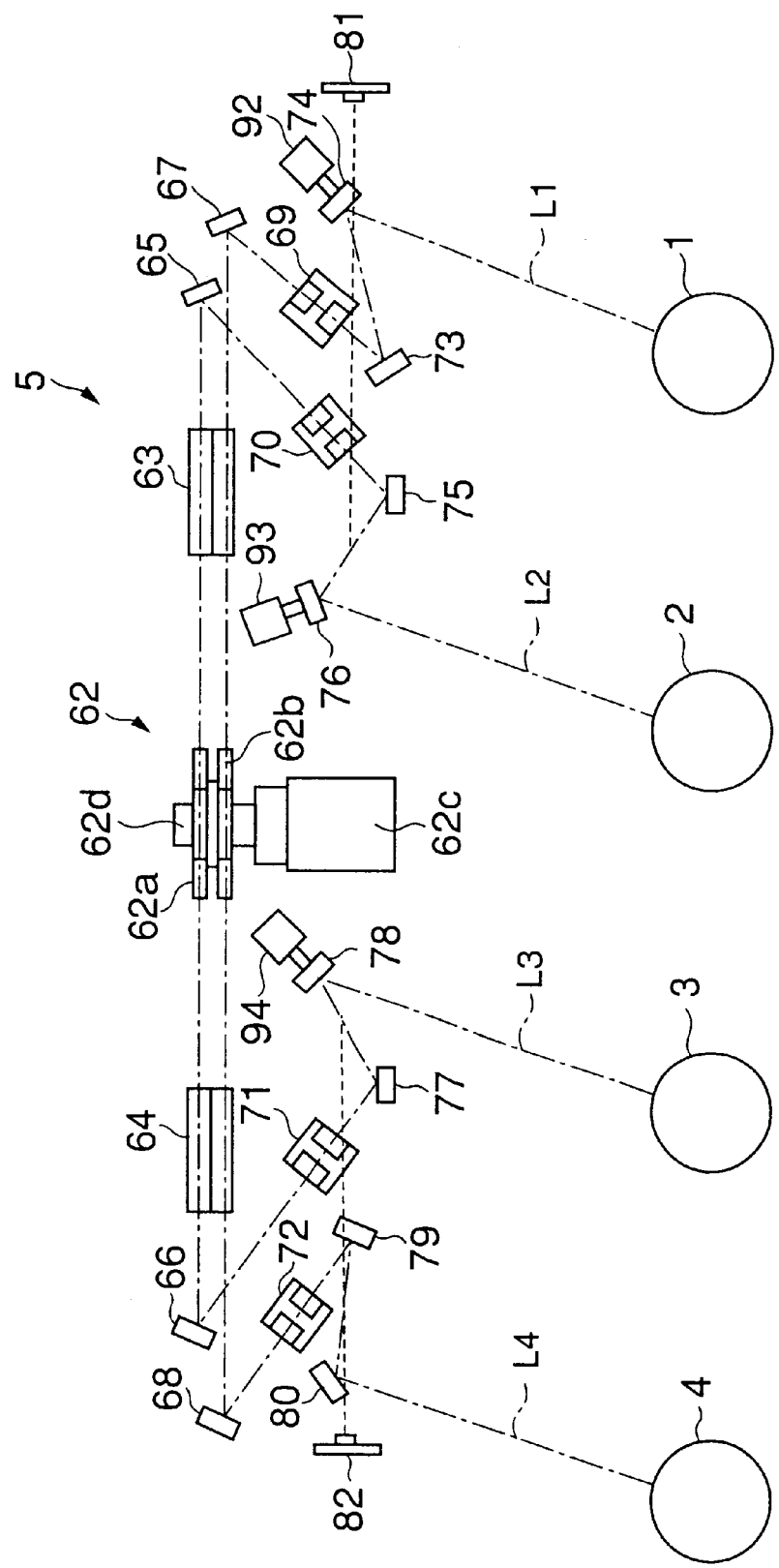
FIG. 5 shows a side elevational view of an optical deflector and optical systems of the optical writing device shown in FIG. 1.
Figure 6:
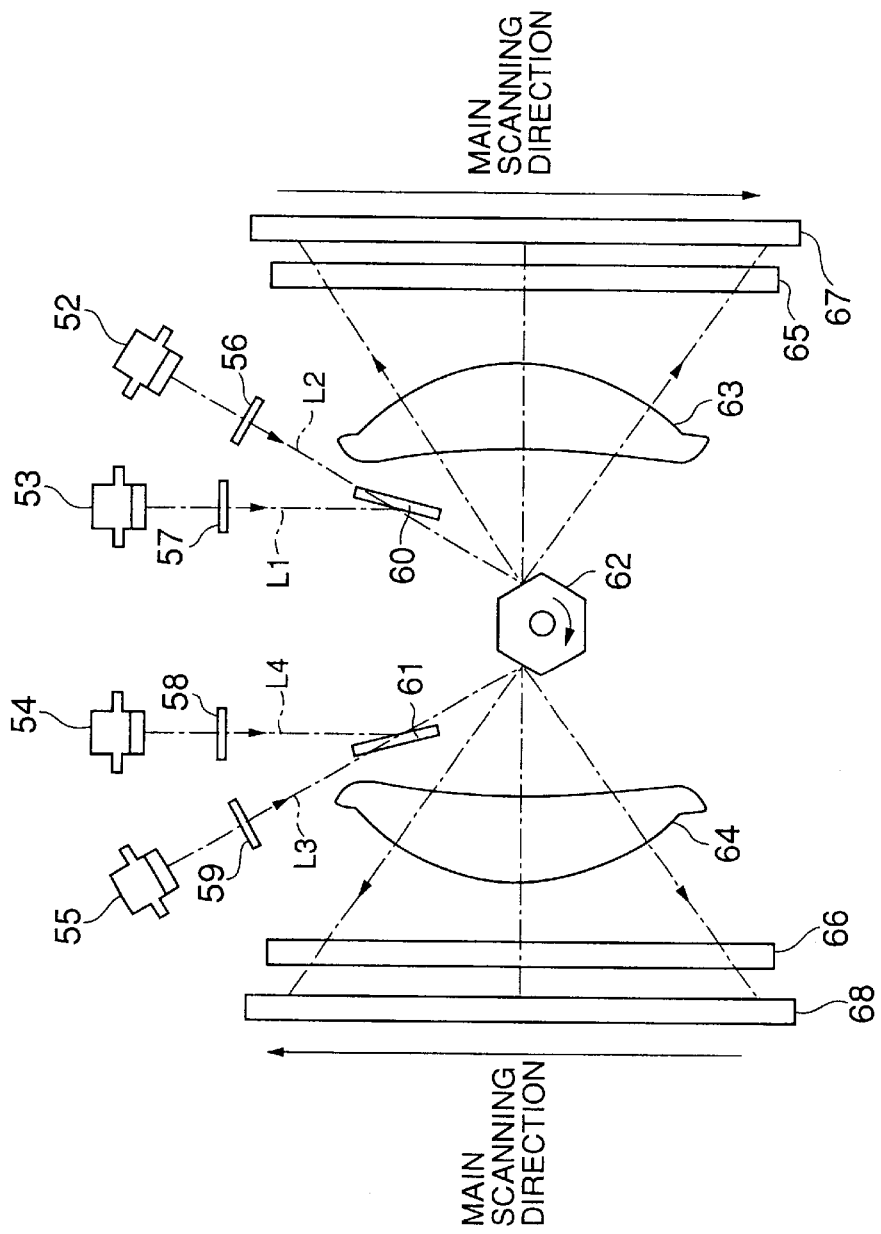
FIG. 6 shows a plan view of light-source units, optical deflector and optical systems of the configuration shown in FIG. 3.

FIG. 1 shows a sectional view of an optical writing device in a first embodiment of the present invention. FIG. 2 shows a general configuration of an image forming apparatus employing the optical writing device shown in FIG. 1. FIG. 3 shows a plan view of a configuration on the top of a base plate of the optical writing device shown in FIG. 1. In addition, FIG. 1 shows a sectional view taken in arrows I—I of FIG. 3. Moreover, FIG. 4 shows a sectional view of the optical writing device shown in FIG. 1 in particular showing a structure of a housing of the optical writing device shown in FIG. 1. FIG. 5 shows, in particular, configurations/structures of an optical deflector and optical systems of the optical writing device shown in FIG. 1. FIG. 6 shows, in particular, configurations/structures of light-source units, the optical deflector, and optical systems of the configuration shown in FIG. 3.

The image forming apparatus shown in FIG. 2 is a full-color image forming apparatus in which four drum-like photoconductive photosensitive bodies (referred to as photosensitive drums, hereinafter) 1, 2, 3 and 4 are disposed side by side. These four photosensitive drums 1, 2, 3 and 4 are used for, for example, forming images of respective color components such as yellow (Y), magenta (M), cyan (C), and black (Bk) in order from the right (the order of color components are not limited thereto, and any order may be applied). Around the four photosensitive drums 1, 2, 3 and 4, electrification units (including electrification rollers, electrification brushes, electrification chargers, etc.) 6, 7, 8, and 9 for performing image formation by an electronic photograph process, exposure units for optical beams (laser beams) L1, L2, L3 and L4 from the optical writing device 5, development units (development devices for respective color components of Y, M, C, and Bk) 10, 11, 12, and 13, a transfer and conveyance unit including a transfer conveyance belt 22a and transfer units (each including a transfer roller, transfer brush, etc.) 14, 15, 16 and 17 arranged on the reverse side of the transfer conveyance belt 22a, cleaning parts (including cleaning blades, cleaning brushes, etc.) 18, 19, 20, 21, etc. are arranged. Thereby, image formation of respective color components is performed onto the photosensitive drums 1, 2, 3, and 4, respectively.

As shown in FIG. 2, the optical writing device 5 is arranged in an obliquely top direction of an image forming part in which the four photosensitive drums 1, 2, 3, and 4 are installed side by side, and is mounted to main-body frames 29 and 30 of the image forming apparatus. The optical writing device 5 includes, as shown in FIGS. 1, 2, 3, 4, 5 and 6, for example, four light-source units 52, 53, 54 and 55, an optical deflector 62 that distributes optical beams L1, L2, L3 and L4 from the respective light-source units in symmetrical two directions and carries out deflection and scanning, and optical systems which direct the optical beams L1, L2, L3 and L4 arranged symmetrically in the above-mentioned two directions with respect to the optical deflector 62, and direct the optical beams L1, L2, L3 and L4 deflected onto to-be-scanned surfaces of the photosensitive drums 1, 2, 3 and 4, and thus scanning them, respectively, so as to form latent images thereon (including optical components such as imaging lenses 63, 64, 69, 70, 71 and 72, mirrors for bending light path 65, 66, 67, 68, 73, 74, 75, 76, 77, 78, 79, and 80). These components are contained in a single housing 50.

More specifically, while the housing 50 has a base plate 50A on which the optical deflector 62 and the optical systems are arranged, and a side wall part SOB having a shape of a frame surrounding the circumference of the base plate 50A. There, the base plate 50A is provided in an approximately central part of the side wall 50B which divides the housing 50 vertically. The four light-source units 52, 53, 54, and 55 are arranged on the side wall part 50B of the housing 50. The optical deflector 62 is arranged in an approximately central part of the base plate 50A of the housing 50. The optical components of the optical systems (including the imaging lenses 63, 64, 69, 70, 71 and 72; light-path bending mirrors 65, 66, 67, 68, 73, 74, 75, 76, 77, 78, 79, and 80) are arranged on both sides (the top side and bottom side) of the base plate 50A. Moreover, covers 87 and 88 are provided on top and bottom of the housing 50, openings through which the optical beams pass are provided in the cover 87, which openings are covered by dust-proof glasses 83, 84, 85, and 86 attached thereto, respectively.

In addition, as shown in FIG. 4, the housing 50 is such that the base plate 50A and the side wall part 50B are formed integrally by resin molding, and have such a configuration that a sectional view of the housing 50 is approximately H-shaped. Moreover, the housing 50 is formed by a resin material having an expansivity (heat expansion rate) such that a difference in expansivity between the housing 50 and the frame 29 and 30 of the image forming apparatus body, to which the optical writing device 5 is mounted, is small.

By the optical writing device 5, image data which is inputted, in a form of separate signals for respective color components, from a document reading device (scanner) or an image data output unit (a personal computer, a word processor, a facsimile, etc.) which is not shown in the figures, is converted into signals for driving the light sources, then, according thereto, the light source in each light-source units 52, 53, 54, and 55 (semiconductor laser (LD)) is driven, and emits an optical beam (laser beam). The optical beam emitted from each of the light-source units 52, 53, 54, and 55 passes through a cylindrical lens 56, 57, 58 or 59 which corrects surface inclination. Then, the optical beam, directly or after reflected by the mirrors 60 and 61, reaches the optical deflector 62, and the respective beams are deflected in the symmetrical directions by double-stage polygon mirrors 62a and 62b which are rotated at a uniform velocity by a common polygon motor 62c. In addition, although the polygon mirrors mentioned above have a configuration of double stages separate vertically for the optical beams of L2 and L3, and for the optical beams of L1 and L4, as shown in FIGS. 1 and 5, it is also possible that the same function is performed by a single axially longer polygon mirror.

The optical beams deflected by the polygon mirrors 62a and 62b of the optical deflector 62 in the two directions, pass through the first imaging lenses 63 and 64 each of which is an fθ lens having a vertical double-layer configuration, respectively, and is bent by the first bending mirrors 65, 66, 67, and 68, and, then, after passing through the openings of the base plate 50A, pass through the second imaging lenses 69, 70, 71 and 72 each being a long toroidal lens, or the like, bent by the second bending mirror 73, 75, 77, 79, and, the third bending mirrors 74, 76, 78, and 80, then pass through dust-proof glasses 83, 84, 85, and 86, and irradiate the to-be-scanned surfaces of the photosensitive drums 1, 2, 3 and 4 for the respective color components, and, thus, write electrostatic latent images thereonto, respectively.

In the above-mentioned optical writing device 5, each of the four light-source units 52, 53, 54, and 55 includes a semiconductor laser (LD) which is the light source, and a collimator lens which performs collimating function on the optical beam emitted from the semiconductor laser, and are assembled into a holder integrally. However, a light-source unit for black (for example, the light-source unit 54) used abundantly at a time of monochrome image formation may have a multi-beam configuration including a plurality of light sources (LDs) and collimator lenses in order to enable high-speed writing. Moreover, when the light-source unit thus has a configuration for the multi-beam writing, the light-source unit may be configured rotatably with respect to the optical axis on the side wall part 50B of the housing 50. Thereby, the beam pitch along the sub-scanning direction can be adjusted, and, thereby, the pixel density (for example, 600 dpi, 1200 dpi, etc.) can be switched at the time of monochrome image formation.

Furthermore, a mirror for synchronous detection not shown in the figure for taking out the optical beam at the scanning beginning position along the main scanning direction is provided on in the light path of each optical beam L1, L2, L3, or L4, and the optical beams reflected by the mirrors for synchronous detection are incident on synchronous detectors 81 and 82, and, thereby, synchronization signals for scanning beginning are outputted, respectively, as shown by broken lines in FIG. 5. Moreover, the third bending mirrors 74, 76 and 78 arranged on the light paths of the optical beams L1, L2 and L3 have the stepper motors 92, 93 and 94 for skew adjustment provided thereto, as shown in FIG. 5, and, thereby, deviations in the scanning line positions of the optical beams of L1, L2 and L3 are corrected based on the scanning line position of the optical beam of L4.

It is noted that a scanning direction (deflection direction) of the optical beam deflected by the optical deflector 62 is the main scanning direction, and this direction is the same as the axial direction of each photosensitive drum. Moreover, the direction which intersects perpendicularly with this main scanning direction is the sub-scanning direction, and this direction is the same as the rotation direction (direction in which the photosensitive drum surface moves) of the photosensitive drum, and is the same as the conveyance direction of the transfer conveyance belt 22a which will be described later. That is, the width direction of the transfer conveyance belt 22a corresponds to the main scanning direction while the conveyance direction of the transfer conveyance belt 22a corresponds to the sub-scanning direction.

Below the four photosensitive drums 1, 2, 3 and 4, installed side by side, as shown in FIG. 2, the transfer conveyance belt 22a laid between a drive roller and a plurality of follower rollers is arranged, and is driven along the conveyance direction indicated by the arrow in the figure by the drive roller. Moreover, a plurality of paper feeder units 23 and 24 which contain transfer material such as record paper are installed in a lower part of the image forming apparatus body, and the paper is fed therefrom into transfer conveyance belt 22a through a feed roller, a conveyance roller, and a register strike roller 25, and then is carried and conveyed by the transfer conveyance belt 22a.

Each latent image formed on each photosensitive drum 1, 2, 3 or 4 by the above-mentioned optical writing device 5 is developed and visualized by toner of each color component of Y, M, C or Bk by each development part 10, 11, 12, or 13, the thus-formed toner image of each color component is transferred and laid on top of each other by each transfer unit 14, 15, 16 or 17 of transfer conveyance device 22, on the transfer material carried on the transfer conveyance belt 22a, one by one, in a superimposed manner. And the transfer material (paper) onto which the images of four color components have been transferred in the superimposed manner, then, after it is conveyed into a fixing unit 26, which then fixes the thus-formed multi-color image onto the transfer material (paper), is ejected onto a delivery tray 28 by a delivery roller 27.

The configuration and operation of the optical writing device and image forming apparatus according to the present invention has been described. In the optical writing device 5 according to the present invention, the housing 50 has the base plate 50A on which the optical deflector 62 and the optical systems are arranged, and the side wall part 50B having the shape of the frame surrounding the circumference of base plate 50A. The base plate 50A is provided in an approximately central portion of the side wall part 50B, and divides the housing 50 vertically. The four light-source units 52, 53, 54, and 55 are arranged on the side wall part 50B of the housing 50, the optical deflector 62 is arranged in the approximately central part of base plate 50A of the housing 50, and the optical components of the optical systems (imaging lenses 63, 64, 69, 70, 71, 72, light path bending mirrors 65, 66, 67, 68, 73, 74, 75, 76, 77, 78, 79, 80 and so forth) are distributed onto the top and bottom surfaces of the base plate 50A. Thereby, the size of the housing 50 of the optical writing device can be reduced to less than half of the light path of opitcal beam for each color component, while securing the necessary light path length of the whole optical system. Accordingly, it is possible to achieve a compact opitcal writing device.

In addition, as shown in FIG. 4, it is possible to secure the strength of the housing 50 while miniaturization of the housing 50 can be achieved, since the housing 50 has the configuration in which the base plate 50A and side wall part 50B are formed integrally by resin molding, and have the H-shaped sectional view. As a result, vibration by rotation of the optical deflector 62 etc. can be effectively controlled, and the optical characteristic/performance can be maintained. Moreover, since the housing 50 is made by resin molding, the weight can be made small, since thereby no post-processing is necessary, productivity is high, and manufacture cost can be held down. Furthermore, the housing 50 is made of a resin material having the expansivity such that difference in expansivity between the housing 50 and the frame 29 and 30 of the image forming apparatus body to which the housing 50 of the optical writing device 5 is mounted is small, any distortion of the housing 50 by temperature change etc. in the state where the housing 50 of the optical writing device 5 is fixed to the frame 29 and 30 of image forming apparatus body can be effectively controlled and thus the optical characteristic/performance of the optical writing device can be maintained.

Since the image forming apparatus having the configuration shown in FIG. 2 employs a compact configuration of the optical writing device 5 as shown in FIGS. 1, and 3–6, it is possible to provide a miniaturized, inexpensive full-color image forming apparatus in comparison to a tandem color image forming apparatus in the related art. Further, as shown in FIG. 2, the further miniaturization of the color image forming apparatus can be attained by installing aslant the imaging part in which the four photosensitive drums 1, 2, 3, and 4 are installed side by side, optical writing device 5 and the transfer conveyance device 22.

As described above, according to the present invention, the optical writing device includes the four light sources, the optical deflector which distributes the optical beams from these four light sources and deflects them in the symmetrical two directions, the optical systems arranged symmetrically corresponding to the above-mentioned two directions with respect to the optical deflector and direct the thus-deflected four optical beams onto the respective to-be-scanned surfaces. Further, in the optical writing device, the plurality of the four light sources, optical deflector, and optical systems are arranged in the single housing. Further, in this optical writing device, the housing includes the base plate on which the above-mentioned optical deflector and optical systems are arranged, and the side wall part having the shape of the frame surrounding the circumference of this base plate. The above-mentioned base plate is provided in the approximately central portion of the above-mentioned side wall part, and divides the housing vertically. Further, the above-mentioned light sources are provided on the side wall part of the above-mentioned housing, the above-mentioned optical deflector is disposed in the approximately central part of the above-mentioned base plate, the optical components of the optical systems are distributed on the top and bottom sides of the base plate. Thereby, the miniaturization of the optical writing device can be attained with securing the necessary light path length of the whole optical system.

Furthermore, in the optical writing device according to the present invention, since the above-mentioned housing including the base plate and side wall part is made by resin integral molding, and has the H-shaped sectional view, while miniaturization of the housing can be achieved, the strength thereof can be secured, and vibration by rotation of the optical deflector etc. can be effectively controlled, and the optical characteristic/performance thereof can be maintained. Moreover, since the housing is made of resin formed by molding, the weight can be made small, any post-processing is thus unnecessary, thereby productivity is high, and the manufacture cost can be held down. Furthermore, in the optical writing device according to the present invention, since the expansivity of the frame of the image forming apparatus body to which the housing of the optical writing device is mounted and the expansivity of the housing are close although the housing is made of resin, distortion of the housing due to temperature change etc. is not likely to occur, and thus the above-mentioned housing can maintain the optical characteristic of the optical writing device, in the state in which the housing of the optical writing device is fixed to the frame of the image formation apparatus body.

As an example of the material of the above-mentioned housing 50 of the optical writing device 5, the following material employing polycarbonate as a base thereof may be used:

PANLITE, No. DV-5150RH made by Teijin Chemicals, Ltd., Research & Development Division This material has the expansivity of 1.1 through $1.8 \times 10^{-5}/°C.^{-1}$ measured for a molded housing having a dimension of 306 mm×368 mm×70 mm, for example, according to the inventors' measurement. For reference, also according to the inventors' measurement, an aluminum-made housing having the same shape has the expansivity of 1.1 through $2.0 \times 10^{-5}/°C.^{-1}$. Thus, the above-mentioned material has the same expansivity as that of aluminum.

Furthermore, it is preferable that the material of the above-mentioned housing 50 is one having a color by which light is not likely to be reflected, such as black, or the like. This is because, some case, the lenses of the optical writing device which inherently are optical components of transmitting light may reflect light, and, also, leaf springs, ends of glass materials and so forth of the optical writing device and/or other parts/components of the image forming apparatus which employs the optical writing apparatus may reflect light, and, the thus-reflected light may then be reflected by the housing 50, and, then, be returned/directed to the above-mentioned effective scanning range. Thereby, the relevant portion of the range has a higher luminous energy, and thereby, a flare phenomenon occurs. In order to prevent such a problematic situation from occurring, the material of the housing 50 is preferably has a color, the housing 50 may be coated by a paint of the color, or the like, by which light is not likely to be reflected.

According to the present invention, preferably, for example, the plurality of image carrying bodies, the optical writing device which apples the optical beams and writes latent images on the respective to-be-scanned surfaces of the image carrying bodies, the development units developing and forming visible images from the latent images formed on the respective image carrying bodies by the developers of respective different color components, a unit which conveys transfer material (paper) and lays the visible images of respective color components onto the conveyed transfer material (paper) one by one at the positions of the respective image carrying bodies on top of each other, and thus transfers them, and a unit which fixes the thus-formed multi-color image formed on the transfer material (paper) thereto. In this configuration, since the above-described compact-sized optical writing device is employed, it is possible to provide a miniaturized, inexpensive, tandem full-color image forming apparatus.

In such an optical writing device which carries out deflection of the beam from the light source by a deflector, and forms a latent image on a to-be-scanned surface of a photosensitive body, it is necessary to stabilize the diameter of spot of the optical beam formed on the to-be-scanned surface. For example, a configuration in which an fθ lens which corrects the optical beam to the main scanning direction and a long toroidal lens which corrects the optical beam to the sub-scanning direction are arranged between an optical deflector such as a polygon mirror and a to-be-scanned surface is disclosed by Japanese Laid-Open Patent Application No. 3-33712.

However, an optical scanning lens, such as an fθ lens or a toroidal lens has a complicated shape and a high accuracy thereof is required in manufacture thereof to maintain the optical characteristic thereof in high level. Further, it is needed to prevent generating of distortion or deformation thereof not only in manufacture thereof but also in assembly thereof. In particular, the long toroidal lens is thin and having a concave surface on the side of beam incident, and, the demand of preventing distortion and deformation is higher than for an fθ lens. Especially, manufacture cost is high for a glass made toroidal lens having a high rigidity.

Figure 7:
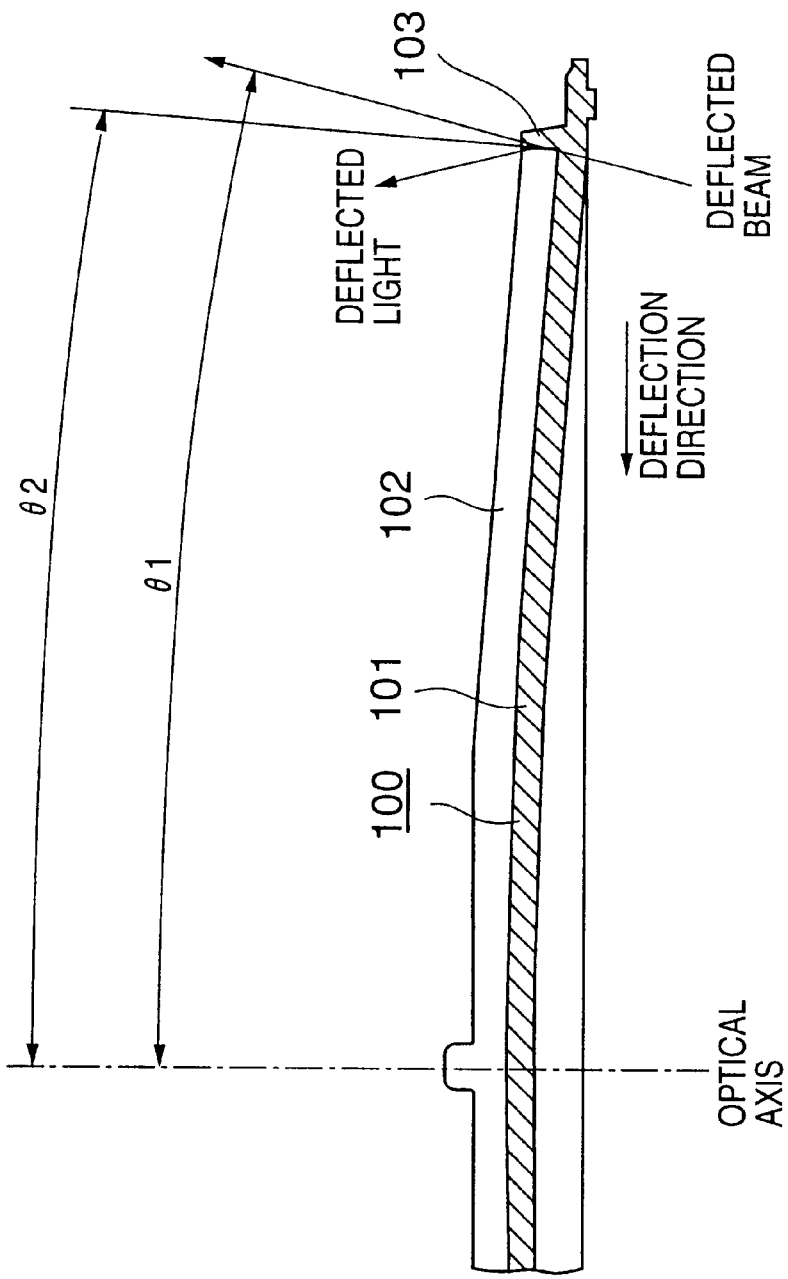
FIG. 7 shows a partial horizontal sectional view of a toroidal lens in the related art taken in parallel to a deflection plane formed by a deflected beam incident on the lens being deflected by an optical deflector.

Then, as shown in FIG. 7, a toroidal lens in which a lens part 101 which converges a beam deflected in a fixed range onto a to-be-scanned surface such as a photosensitive body, and a reinforcement part 102 which reinforces this lens part 101 are integrally molded has been proposed, for example. In this example, the reinforcement part 102 has a frame-like form and surrounds the lens part 101 on the both sides along the longitudinal direction thereof and both ends in the longitudinal direction thereof, when being viewed from the exit direction of the beam. FIG. 7 shows a horizontal sectional view of a part of the toroidal lens 100 in the related art taken in parallel to a deflection plane of the beam (a plane formed by the beam being deflected by the optical deflector and passing through the relevant lens). Thus, it is advantageous, for preventing distortion and deformation of the lens 100, since the rigidity thereof increases, when the lens part 102 and the reinforcement part 102 are integrally molded.

Generally, in order that an optical scanning system lens like an fθ lens or a toroidal lens may attain the miniaturization of an entire optical writing device employing it, it is required that the length thereof along the deflection direction (direction in which the beam is deflected by the optical deflector) should be shortened as much as possible. In the case of the toroidal lens 100 shown in FIG. 7 in which a standing wall 103 is formed at each of both ends in the longitudinal direction of the lens part 101 as a part of the frame-like reinforcement part 102, and when the angle θ1 of the deflected beam (deflected by the optical deflector) at the end of the lens part 101 with respect to the optical axis of the lens part 101 is larger than the angle θ1 of the standing wall 103 of the reinforcement part 102 with respect to the optical axis of the lens part 101, the deflected beam is reflected by the standing wall 103, and the thus-generated reflected light unexpectedly increases luminous energy in the effective scanning range, and thus may cause an abnormality in a latent image thus formed on a to-be-scanned surface. However, when the length of the toroidal lens 100 is elongated in order to prevent generating of such abnormality in a latent image formed on the to-be-scanned surface, miniaturization of the entire optical writing device may not be sufficiently achieved.

Therefore, it is desirable to prevent generating of abnormality in a latent image formed on a to-be-scanned surface in a configuration of an optical scanning lens such as a toroidal lens in which such a standing wall is provided for reinforcing it.

Figure 8:
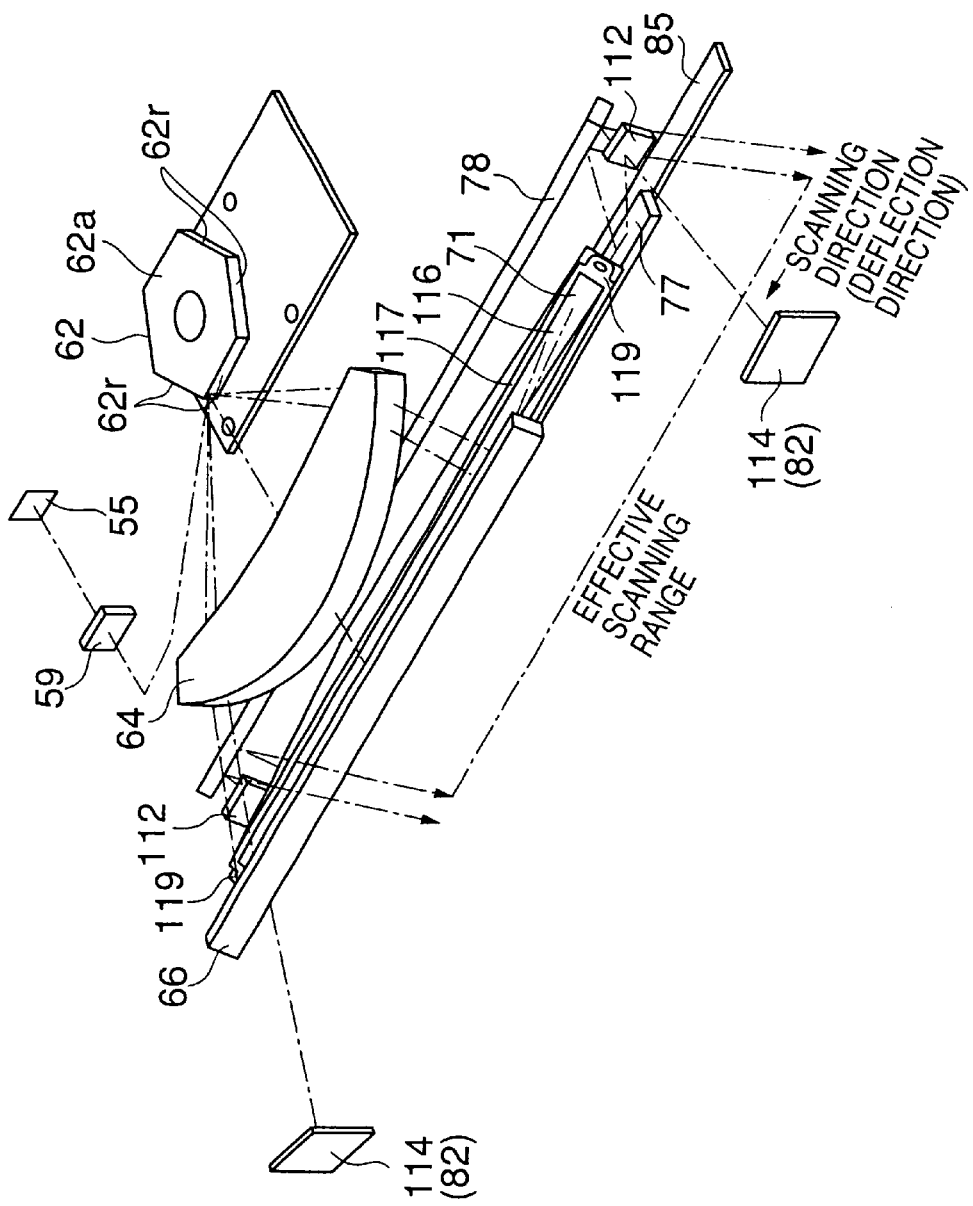
FIG. 8 shows a perspective view illustrating the optical writing device shown in FIG. 1 partially in particular concerning a certain laser beam.
Figure 9:
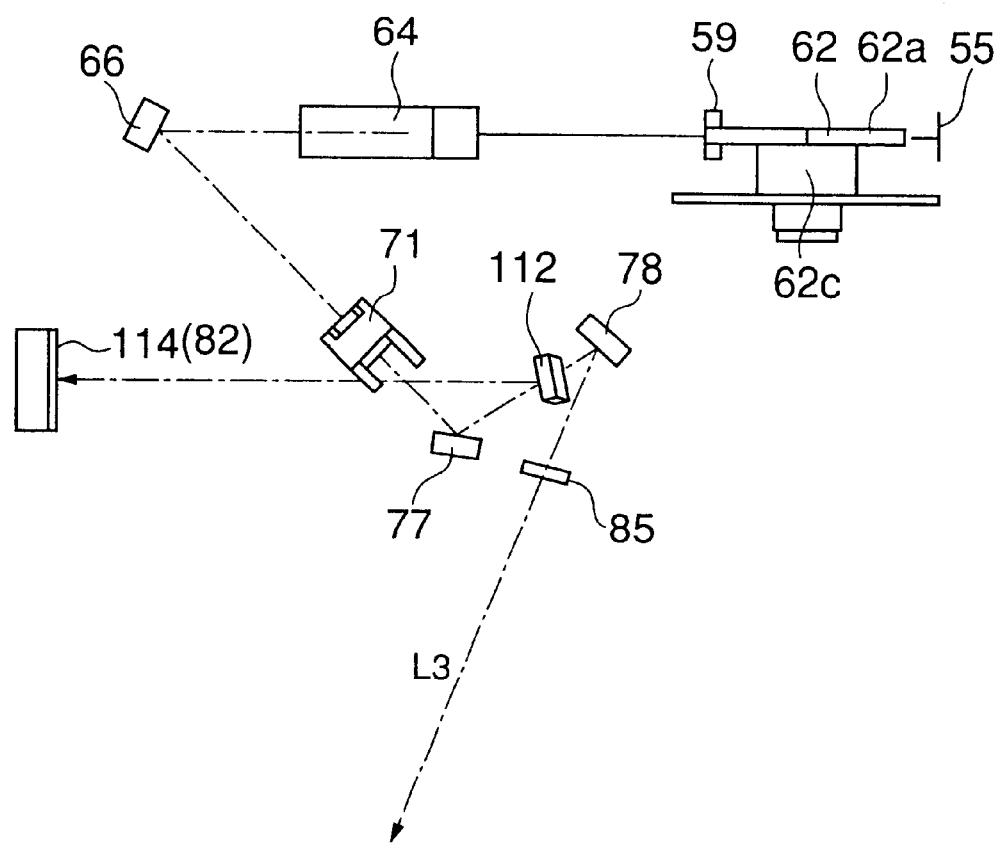
FIG. 9 shows a side elevational view of a configuration shown in FIG. 8.
Figure 10:
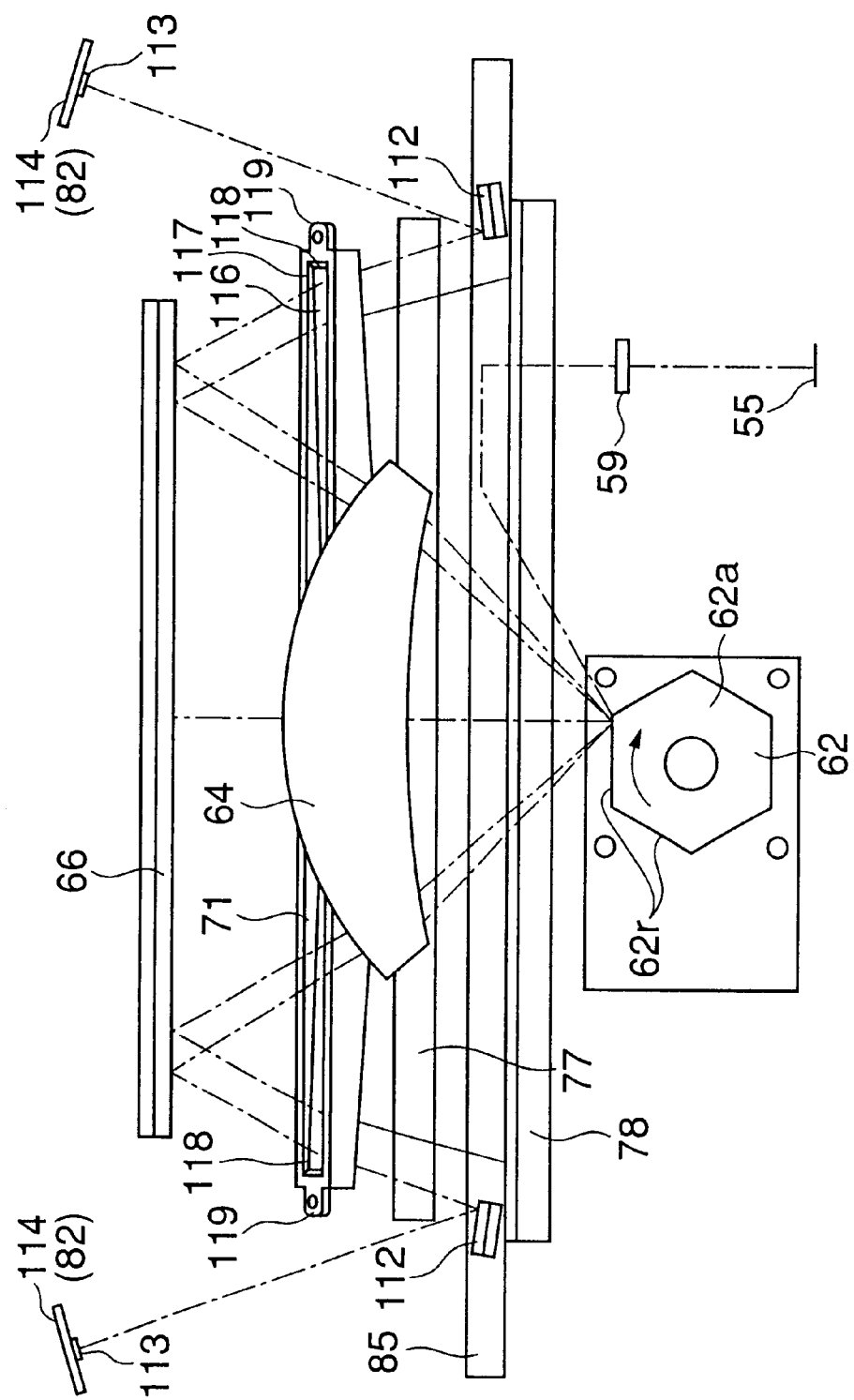
FIG. 10 shows a plan view of the configuration shown in FIG. 8.
Figure 11:
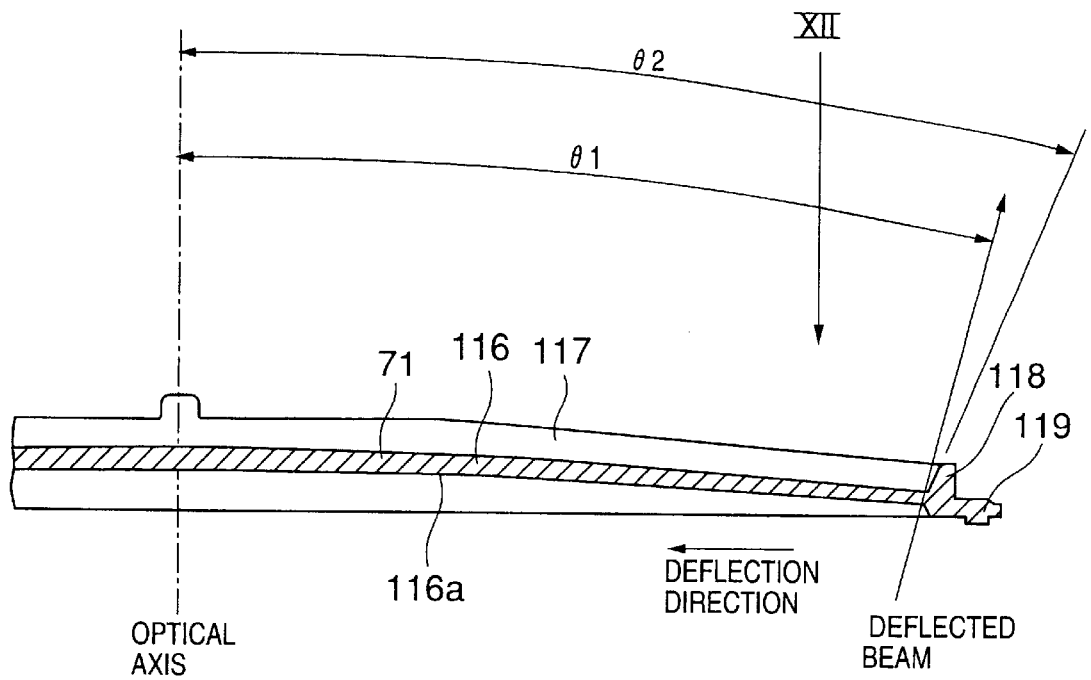
FIG. 11 shows a horizontal sectional view of a toroidal lens shown in FIG. 8 taken in parallel to a deflection plane formed by a deflected beam incident on the lens being deflected by the optical deflector.

FIGS. 8, 9 and 10 show a partial configuration of the above-described optical writing device in the embodiment of the present invention shown in FIGS. 1 through 6 especially showing components concerning the laser beam L3, for illustrating a configuration of the optical scaring device in particular for the laser beam L3, although the deposition/configuration of the respective components shown there are not necessarily the same as those shown in FIGS. 1 through 6. (In FIGS. 8 through 10, although a light path between the cylindrical lens 59 and polygon mirror 62a is shown as if it is bent, the light path is actually straight as shown in FIG. 6.) FIG. 8 shows a perspective view, FIG. 9 shows a side elevational view and FIG. 10 shows a plan view. FIG. 11 shows a partial horizontal sectional view of the above-mentioned toroidal lens 71 taken in parallel to the deflection plane of the deflected beam being deflected by the optical deflector 62.

As shown in FIGS. 8, 9 and 10, the above-mentioned deflector 62 carries out deflection of the beam emitted from the above-mentioned light-source unit (laser light generation part) 55 and passing through the above-mentioned cylindrical lens 59, as mentioned above. This deflector 62 includes the motor 62c (see FIG. 9) and the polygon mirror 62a directly connect therewith. The polygon mirror 62a has a plurality of reflective surfaces 62r which carry out the deflection of the beam from the light source 55.

In the light path between the polygon mirror 62a and the to-be-scanned surface (of the photosensitive body 3), the above-mentioned fθ lens 64 as the first optical scanning lens, bending mirror 66, toroidal lens 71 as the second optical scanning lens, bending mirrors 77 and 78 are arranged in sequence, as described above. Furthermore, a pair of synchronous mirrors 112 each of which reflects the deflected beam reflected by the bending mirror 77 are arranged near both ends of the mirror 77, and photodiodes 113 (see FIG. 10, corresponding to the above-mentioned photodiode 82 shown in FIG. 5) each of which receives the deflected beam reflected by a respective one of these synchronous mirrors 112, and outputs a synchronized signal, are provided on synchronous detection plates 114, respectively.

In addition, the light source 55, the cylindrical lens 59, the polygon mirror 62a, the fθ lens 64, the bending mirrors 66, 77 and 78, the toroidal lens 71, the synchronous mirrors 112, the synchronous detection plates 114, etc. are formed in the above-mentioned dust-proof housing 50 (see FIG. 1, for example). The above-mentioned opening which allows the deflected beam reflected by the bending mirror 78 to be directed toward the to-be-scanned surface of the photosensitive body 3 is provided in the housing 50, and is covered by the above-mentioned transparent dust-proof glass 85, as mentioned above.

There, the toroidal lens 71 is formed by resin molding of a lens part 116 long along the deflection direction of the beam, a reinforcement part 117 which reinforces the lens part 16, standing walls 118 each of which is a portion of the lens part 116 and projects in a direction along which the deflected beam passes therethrough, and attachment parts 119 each of which extends outside from a respective one of these standing walls 118 integrally. In this example, the attachment parts 119 are formed in order to attach the toroidal lens 71 inside of the above-mentioned dust-proof housing 50. The lens part 116 has concave a surface having a barrel-shaped toroidal surface 116a on the incidence side on which the beam deflected by the optical deflector 62 is incident, and, as shown in FIG. 7, is reinforced by the thin reinforcement part 117. Since this reinforcement part 117 is used for preventing the distortion of the lens part 116 at the time of molding of the toroidal lens 71 and the deformation at the time of assembly thereof, a frame-like form is desirable, as shown in FIGS. 8, 9 and 10, such that both ends in the longitudinal direction and both sides along the longitudinal direction of the lens part 116 are surrounded thereby.

Further, in this configuration of the toroidal lens 71, the angle θ1 between the optical axis of the lens part 116 and the deflected beam (scanning beam) at the end of the lens part 116 and the angle θ2 between the optical axis of the lens part 116 and the inner surface of each of the standing wall 118 have a relationship as θ1<θ2, as shown in FIG. 11. In this case, although the deflection angle of the beam in which the deflection is carried out by the polygon mirror 62a may change depending on the incident angle of the beam on the polygon mirror 62a from the light source 55, the relationship of θ1<θ2 does not change even when the distance between the toroidal lens 71 and the polygon mirror 62 changes.

In such a configuration, the deflection of the beam emitted by the light source 55 is carried out by the polygon mirror 62 which is rotated by the motor 62c. The beam which passes through the fθ lens 64 is deflected in the longitudinal direction of the toroidal lens 71. The deflected beam is then reflected by the mirror 77 and the synchronous mirror 112, and the deflected beam (scanning beam) which passes through the end of the toroidal lens 71 is detected by the photodiode 113 as the synchronous detection signal, as mentioned above, and the deflected beam (scanning beam) which passes through the middle part of the scanning range of the toroidal lens 71 is reflected by the mirrors 77 and 78, then scans the photosensitive body 3.

The deflected beam which passes through the end of the lens part 116 having the angle θ1 with respect to the optical axis thereof is used for synchronous detection which is incident on the photodiode 113, and this deflected beam can be prevented from being reflected by the standing wall 118. This is because the above-mentioned relationship of θ1<θ2 is set. Thereby, it is possible to prevent the luminous energy from becoming abnormally higher at the end of the effective scanning range and thus to prevent abnormality in a printed image resulting from that, from occurring.

Furthermore, since reflection of the deflected beam toward the effective scanning range (a range on the surface to be scanned which is used for forming an effective latent image thereon) can be prevented without lengthening the length of the lens part 116, it can contribute to the miniaturization of the entire optical writing device.

In addition, the concept that each standing wall 118 is formed in forming the lens part 116 and the reinforcement part 117 integrally and the relationship of θ1<θ2 as mentioned above is set in the toroidal lens can also be applied to the fθ lens.

A second embodiment of the present invention will now be described. The optical writing device in the second embodiment of the present invention is the same as the above-described first embodiment except that the toroidal lens 71 is replaced by a toroidal lens 71'. The toroidal lens 71' in the second embodiment is the same as the toroidal lens 71 in the first embodiment except that, in the second embodiment, the above-mentioned relationship θ1<θ2 shown in FIG. 11 is not necessarily to hold, but the second embodiment has the following feature.

Figure 12:
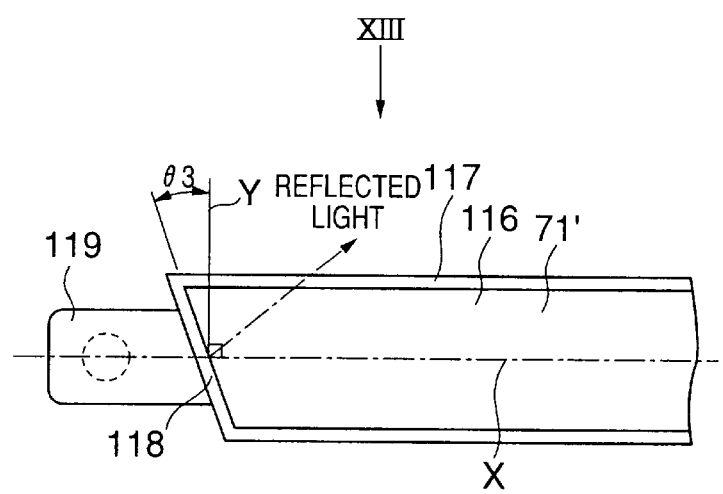
FIG. 12 shows a partial rear elevational view of a toroidal lens of an optical writing device in a second embodiment of the present invention.
Figure 13:
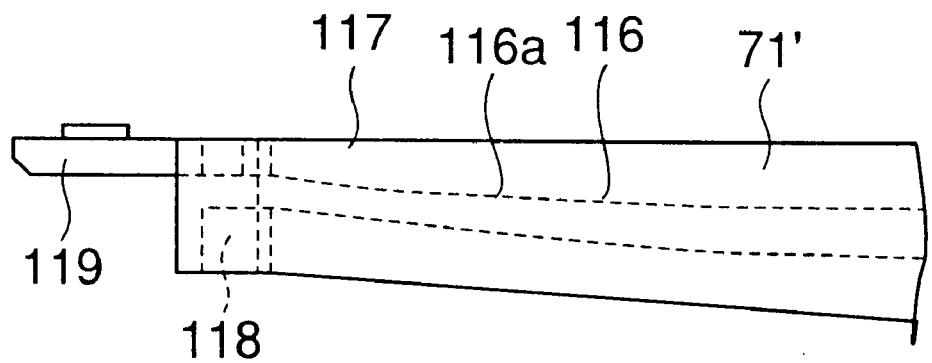
FIG. 13 shows a partial plan view of the toroidal lens shown in FIG. 12.

FIG. 12 shows a partial rear view of the toroidal lens 71' viewed from the beam exit side thereof in the arrow XII shown in FIG. 11. FIG. 13 shows a partial plan view of the toroidal lens 71' viewed from a direction perpendicular to the deflection plane formed by the beam incident on the lens being deflected by the optical deflector 62.

As shown in FIG. 12, the toroidal lens 71' in the second embodiment has a lens part 116 and a frame-like reinforcement part 117, standing walls 118 and attachment parts 119 formed integrally by resin molding same as in the first embodiment. However, each standing wall 118 in the second embodiment inclines at the angle θ3 with respective to the plane Y perpendicular to the deflection plane X formed by the beam incident on this lens being deflected by the optical deflector 62, as shown in FIG. 12. This inclination may be either upward one as shown in FIG. 12 or downward one.

In such a configuration, since the lens part 116 and the reinforcement part 117 are formed integrally, the toroidal lens 71' can be prevent from being distorted or deformed. Moreover, it is possible to cause reflected light, if any, generated as a result of the deflected beam being reflected by the standing wall 118 to be directed apart from the deflected plane X as the inner surface of each standing wall 118 is inclined with respect to the plane Y, shown in FIG. 12, that is, inclined/rotated around the optical axis of the toroidal lens 71'. Thereby, it is possible to prevent the luminous energy from becoming abnormally higher at the end of the effective scanning range and thus to prevent abnormality in a printed image resulting from that, from occurring.

Further, in a case of a tandem image formation apparatus such as that shown in FIGS. 1 through 5, there is a case where a single photodetector such as 81 or 82 shown in FIG. 5 is used in common for the laser beams L1 and L2 or L3 and L4. In such a case, also, a toroidal lens such as that 69, 70, 71 or 72 may be used in common for the laser beams L1 and L2 or L3 and L4. In such a case, an end portion of the toroidal lens may be used for two or more laser beams for the synchronization detection. In such a case, in order to distinguish these beams, respective positions of the end portion of the toroidal lens at which these beams pass through should be separated apart to be incident on different mirrors before being incident on the common photodetector. Thereby, it is possible to make different the timing at which these beams are incident on the common photodetector. For this propose, a very end of the toroidal lens should be used so that the length of the toroidal lens can be prevented from being much enlarged due to the use thereof for the synchronization detection in common for the plurality of beams. Accordingly, the configuration shown in FIGS. 11 or 12 for preventing the beam passing through the end of the toroidal lens from being reflected by the standing wall and then directed toward the effective scanning range is particularly advantageous for such a case.

Furthermore, also in the second embodiment, since reflection of the deflected beam into the effective scanning range can be prevented without lengthening the length of the lens part 116, it can contribute to the miniaturization of the entire optical writing device.

In addition, also in the second embodiment, the concept that each standing wall 118 is formed in forming the lens part 116 and the reinforcement part 117 integrally and the inner surface of the standing wall 118 is inclined with respect to the above-mentioned plane Y in the toroidal lens 71' as mentioned above in the toroidal lens can also be applied to the fθ lens.

Although particularly the configuration of the optical writing device concerning the laser beam L3 has been described in detail with reference FIGS. 8 through 12, the configuration concerning any of the other laser beams L1, L2 and L4 should be basically the same as it.

Furthermore, the present invention is not limited to application to a tandem multi-color image forming apparatus such as that shown in FIG. 2 but can also be applied to an image forming apparatus which employs an optical writing device having a configuration only including a single set of components shown in FIGS. 8 through 10.

Further, the present invention is not limited to the above-described embodiments, and variations and modifications may be made without departing from the scope of the present invention.

The present application is based on Japanese priority applications Nos. 2000-290678 and 2000-339215, filed on Sep. 25, 2000 and Nov. 7, 2000, respectively, the entire contents of which are hereby incorporated by reference.

What is claimed is:

1. An optical writing device comprising:

a plurality of light sources;

an optical deflector deflecting optical beams generated by said plurality of light sources in two symmetrical directions;

optical systems disposed in said two symmetrical directions with respect to said optical deflector, and directing the optical beams deflected by said optical deflector into respective surfaces to be scanned, and forming images thereon; and a housing containing said plurality of light sources, optical deflector and optical systems, wherein said housing comprises a base plate on which said optical deflector and optical systems are disposed, and a side wall part surrounding said base plate;

said base plate divides said housing into two sections;

said plurality of light sources are disposed on said side wall part; and optical components of said optical systems are distributed into said two sections of said housing;

wherein said housing is such that said base plate and side wall part are formed by integral resin molding; and said housing has an approximately H-shaped sectional view.

2. The optical writing device as claimed in claim 1, wherein said housing is formed of a resin material having an expansivity smaller than that of a frame of an image forming apparatus body to which said optical writing device is mounted.

3. An optical writing device comprising:

a light source unit;

an optical deflector deflecting an optical beam generated by said light source unit;

an optical system directing the optical beam deflected by said optical deflector into a surface to be scanned, and forming an image thereon; and a housing containing said light source unit, optical deflector and optical system, wherein said housing comprises a base plate on which said optical deflector and optical system are disposed, and a side wall part surrounding said base plate;

said base plate divides said housing into two sections;

said light source unit is disposed on said side wall part; and optical components of said optical system are distributed into said two sections of said housing;

wherein said housing is such that said base plate and side wall part are formed by integral resin molding; and said housing has an approximate H-shaped sectional view.

4. The optical writing device as claimed in claim 3, wherein said housing is formed of a resin material having an expansivity smaller than that of a frame of an image forming apparatus body to which said optical writing device is mounted.

5. An optical writing device comprising:

a plurality of light sources;

an optical deflector deflecting optical beams generated by said plurality of light sources in two symmetrical directions;

optical systems disposed in said two symmetrical directions with respect to said optical deflector, and directing the optical beams deflected by said optical deflector into respective surfaces to be scanned, and forming images thereon; and a housing containing said plurality of light sources, optical deflector and optical systems, wherein said housing comprises a base plate on which said optical deflector and optical systems are disposed, and a side wall part surrounding said base plate;

said base plate divides said housing into two sections;

said plurality of light sources are disposed on said side wall part; and optical components of said optical systems are distributed into said two sections of said housing;

wherein said optical systems comprise an optical scanning lens which comprises:

a lens part converging the deflected beam onto the surface to be scanned;

a reinforcement part reinforcing said lens part; and at least one standing wall projecting from either one of both ends along the longitudinal direction of said lens part in a beam exit direction, wherein said lens part, reinforcement part and at least one standing wall are formed integrally; and an angle θ2 of an inner surface of said at least one standing wall with respect to an optical axis of said lens part is larger than an angle θ1 of the deflected beam at the end of said lens part and the optical axis of said lens part.

6. The optical writing device as claimed in claim 5, wherein an incident surface of said lens part comprises a concave surface comprising a toroidal surface.

7. An optical writing device comprising:

a light source unit;

an optical deflector deflecting an optical beam generated by said light source unit;

an optical system directing the optical beam deflected by said optical deflector into a surface to be scanned, and forming an image thereon; and a housing containing said light source unit, optical deflector and optical system, wherein said housing comprises a base plate on which said optical deflector and optical system are disposed, and a side wall part surrounding said base plate;

said base plate divides said housing into two sections;

said light source unit is disposed on said side wall part; and optical components of said optical system are distributed into said two sections of said housing;

wherein said optical system comprises an optical scanning lens which comprises:

a lens part converging the deflected beam onto the surface to be scanned;

a reinforcement part reinforcing said lens part; and at least one standing wall projecting from either one of both ends along the longitudinal direction of said lens part in a beam exit direction, wherein said lens part, reinforcement part and at least one standing wall are formed integrally; and an angle $\theta 2$ of an inner surface of said at least one standing wall with respect to an optical axis of said lens part is larger than an angle $\theta 1$ of the deflected beam at the end of said lens part and the optical axis of said lens part.

8. The optical writing device as claimed in claim 7 wherein an incident surface of said lens part comprises a concave surface comprising a toroidal surface.

9. An optical writing device comprising:

a plurality of light sources;

an optical deflector deflecting optical beams generated by said plurality of light sources in two symmetrical directions;

optical systems disposed in said two symmetrical directions with respect to said optical deflector, and directing the optical beams deflected by said optical deflector into respective surfaces to be scanned, and forming images thereon; and a housing containing said plurality of light sources, optical deflector and optical systems, wherein said housing comprises a base plate on which said optical deflector and optical systems are disposed, and a side wall part surrounding said base plate;

said base plate divides said housing into two sections;

said plurality of light sources are disposed on said side wall part; and optical components of said optical systems are distributed into said two sections of said housing;

wherein said optical systems comprise an optical scanning lens which comprises:

a lens part converging the deflected beam onto the surface to be scanned;

a reinforcement part reinforcing said lens part; and at least one standing wall projecting from either one of both ends along the longitudinal direction of said lens part in a beam exit direction, wherein said lens part, reinforcement part and at least one standing wall are formed integrally; and an inner surface of said at least one standing wall is inclined with respect to a plane perpendicular to a deflection plane formed by the deflected beam incident on said lens part being deflected by said optical deflector.

10. The optical writing device as claimed in claim 9 wherein an incident surface of said lens part comprises a concave surface comprising a toroidal surface.

11. An optical writing device comprising:

a light source unit;

an optical deflector deflecting an optical beam generated by said light source unit;

an optical system directing the optical beam deflected by said optical deflector into a surface to be scanned, and forming an image thereon; and a housing containing said light source unit, optical deflector and optical system, wherein said housing comprises a base plate on which said optical deflector and optical system are disposed, and a side wall part surrounding said base plate;

said base plate divides said housing into two sections;

said light source unit is disposed on said side wall part; and optical components of said optical system are distributed into said two sections of said housing;

wherein said optical system comprises an optical scanning lens which comprises:

a lens part converging the deflected beam onto the surface to be scanned;

a reinforcement part reinforcing said lens part; and at least one standing wall projecting from either one of both ends along the longitudinal direction of said lens part in a beam exit direction, wherein said lens part, reinforcement part and at least one standing wall are formed integrally; and an inner surface of said at least one standing wall is inclined with respect to a plane perpendicular to a deflection plane formed by the deflected beam incident on said lens part with being deflected by said optical deflector.

12. The optical writing device as claimed in claim 11 wherein an incident surface of said lens part comprises a concave surface comprising a toroidal surface.

13. An optical scanning lens comprising:

a lens part converging a deflected beam onto a surface to be scanned;

a reinforcement part reinforcing said lens part; and at least one standing wall projecting from either one of both ends along the longitudinal direction of said lens part in a beam exit direction, wherein said lens part, reinforcement part and at least one standing wall are formed integrally; and an angle $\theta 2$ of an inner surface of said at least one standing wall with respect to an optical axis of said lens part is larger than an angle $\theta 1$ of the deflected beam at the end of said lens part and the optical axis of said lens part.

14. The optical scanning lens as claimed in claim 13 wherein an incident surface of said lens part comprises a concave surface comprising a toroidal surface.

15. An image forming apparatus comprising:

the optical scanning lens claimed in claim 13, disposed so as to face a surface to be scanned; and an optical deflector deflecting a laser beam so as to cause it to scan said surface to be scanned through said optical scanning lens.

16. An optical scanning lens comprising:
a lens part converging a deflected beam onto a surface to be scanned;
a reinforcement part reinforcing said lens part; and
at least one standing wall projecting from either one of both ends along the longitudinal direction of said lens part in a beam exit direction,
wherein said lens part, reinforcement part and at least one standing wall are formed integrally; and
an inner surface of said at least one standing wall is inclined with respect to a plane perpendicular to a deflection plane formed by a deflected beam incident on said lens part being deflected by an optical deflector.

17. The optical scanning lens as claimed in claim 16 wherein an incident surface of said lens part comprises a concave surface comprising a toroidal surface.

18. An image forming apparatus comprising:
the optical scanning lens claimed in claim 16, disposed so as to face a surface to be scanned; and
an optical deflector deflecting a laser beam so as to cause it to scan said surface to be scanned through said optical scanning lens.

19. An optical writing device comprising:
a plurality of light source means;
optical deflector means for deflecting optical beams generated by said plurality of light source means in two symmetrical directions;
optical system means disposed in said two symmetrical direction with respect to said optical deflector means for directing the optical beams deflected by said optical deflector means into respective surfaces to be scanned, and forming images thereon; and
housing means containing said plurality of light source means, optical deflector means and optical system means,
wherein said housing means comprises a base plate on which said optical deflector means and optical system means are disposed, and a side wall part surrounding said base plate;
said base plate divides said housing means into two sections;
said plurality of light source means are disposed on said side wall part; and
optical components of said optical system means are distributed into said two sections of said housing means;
wherein said housing means is such that said base plate and side wall part are formed by integral resin molding; and
said housing means has an approximately H-shaped sectional view.

20. The optical writing device as claimed in claim 19, wherein said housing means is formed of a resin material having an expansivity smaller than that of a frame of an image forming apparatus body to which said optical writing device is mounted.

21. An optical writing device comprising:
light source means;
optical deflector means for deflecting an optical beam generated by said light source means;
optical system means for directing the optical beam deflected by said optical deflector means into a surface to be scanned, and forming an image thereon; and
housing means containing said light source means, optical deflector means and optical system mean,
wherein said housing means comprises a base plate on which said optical deflector means and optical system means are disposed, and a side wall part surrounding said base plate;
said base plate divides said housing means into two sections;
said light source means is disposed on said side wall part; and
optical components of said optical system means are distributed into said two sections of said housing means;
wherein said housing means is such that said base plate and side wall part are formed by integral resin molding; and
said housing means has an approximately H-shaped sectional view.

22. The optical writing device as claimed in claim 21, wherein said housing means is formed of a resin material having an expansivity smaller than that of a frame of an image forming apparatus body to which said optical writing device is mounted.

23. An optical writing device comprising:
a plurality of light source means;
optical deflector means for deflecting optical beams generated by said plurality of light source means in two symmetrical directions;
optical system means disposed in said two symmetrical direction with respect to said optical deflector means for directing the optical beams deflected by said optical deflector means into respective surfaces to be scanned, and forming images thereon; and
housing means containing said plurality of light source means, optical deflector means and optical system means,
wherein said housing means comprises a base plate on which said optical deflector means and optical system means are disposed, and a side wall part surrounding said base plate;
said base plate divides said housing means into two sections;
said plurality of light source means are disposed on said side wall part; and
optical components of said optical system means are distributed into said two sections of said housing means;
wherein said optical system means comprises:
lens means for converging the deflected beam onto the surface to be scanned;
reinforcement means for reinforcing said lens means; and
at least one standing wall projecting from either one of both ends along the longitudinal direction of said lens means in a beam exit direction,
wherein said lens means, reinforcement means and at least one standing wall are formed integrally; and
an angle $\theta 2$ of an inner surface of said at least one standing wall with respect to an optical axis of said lens means is larger than an angle $\theta 1$ of the deflected beam at the end of said lens means and the optical axis of said lens means.

24. The optical writing device as claimed in claim 23 wherein an incident surface of said lens means comprises a concave surface comprising a toroidal surface.

25. An optical writing device comprising:

light source means;

optical deflector means for deflecting an optical beam generated by said light source means;

optical system means for directing the optical beam deflected by said optical deflector means into a surface to be scanned, and forming an image thereon; and housing means containing said light source means, optical deflector means and optical system means, wherein said housing means comprises a base plate on which said optical deflector means and optical system means are disposed, and a side wall part surrounding said base plate;

said base plate divides said housing means into two sections;

said light source means is disposed on said side wall part; and optical components of said optical system means are distributed into said two sections of said housing means;

wherein said optical system means comprises:
lens means for converging the deflected beam onto the surface to be scanned;
reinforcement means for reinforcing said lens means; and
at least one standing wall projecting from either one of both ends along the longitudinal direction of said lens means in a beam exit direction,
wherein said lens means, reinforcement means and at least one standing wall are formed integrally; and
an angle $\theta 2$ of an inner surface of said at least one standing wall with respect to an optical axis of said lens means is larger than an angle $\theta 1$ of the deflected beam at the end of said lens means and the optical axis of said lens means.

26. The optical writing device as claimed in claim 25 wherein an incident surface of said lens means comprises a concave surface comprising a toroidal surface.

27. An optical writing device comprising:

a plurality of light source means;

optical deflector means for deflecting optical beams generated by said plurality of light source means in two symmetrical directions;

optical system means disposed in said two symmetrical direction with respect to said optical deflector means for directing the optical beams deflected by said optical deflector means into respective surfaces to be scanned, and forming images thereon; and housing means containing said plurality of light source means, optical deflector means and optical system means, wherein said housing means comprises a base plate on which said optical deflector means and optical system means are comprises a base plate on which said optical deflector means and optical system means are disposed, and a side wall part surrounding said base plate;

said base plate divides said housing means into two sections;

said plurality of light source means are disposed on said side wall part; and optical components of said optical system means are distributed into said two section of said housing means;

wherein said optical system means comprises an optical scanning lens which comprises:
lens means converging the deflected beam onto the surface to be scanned;
reinforcement means reinforcing said lens means; and
at least one standing wall projecting from either one of both ends along the longitudinal direction of said lens means in a beam exit direction,
wherein said lens means, reinforcement means and at least one standing wall are formed integrally; and
an inner surface of said at least one standing wall is inclined with respect to a plane perpendicular to a deflection plane formed by the deflected beam incident on said lens means being deflected by said optical deflector means.

28. The optical writing device as claimed in claim 22 wherein an incident surface of said lens means comprises a concave surface comprising a toroidal surface.

29. An optical writing device comprising:

light source means;

optical deflector means for deflecting an optical beam generated by said light source means;

optical system means for directing the optical beam deflected by said optical deflector means into a surface to be scanned, and forming an image thereon; and housing means containing said light source means, optical deflector means and optical system mean, wherein said housing means comprises a base plate on which said optical deflector means and optical system means are disposed, and a side wall part surrounding said base plate;

said base plate divides said housing means into two sections;

said light source means is disposed on said side wall part; and optical components of said optical system means are distributed into said two sections of said housing means;

wherein said optical system means comprises:
lens means for converging the deflected beam onto the surface to be scanned;
reinforcement means for reinforcing said lens means; and
at least one standing wall projecting from either one of both ends along the longitudinal direction of said lens means in a beam exit direction,
wherein said lens means, reinforcement means and at least one standing wall are formed integrally; and
an inner surface of said at least one standing wall is inclined with respect to a plane perpendicular to a deflection plane formed by the deflected beam incident on said lens means being deflected by said optical deflector means.

30. The optical writing device as claimed in claim 29 wherein an incident surface of said lens means comprises a concave surface comprising a toroidal surface.

31. An optical scanning optical system comprising:

lens means for converging a deflected beam onto a surface to be scanned;

reinforcement means for reinforcing said lens means; and at least one standing wall projecting from either one of both ends along the longitudinal direction of said lens means in a beam exit direction, wherein said lens means, reinforcement means and at least one standing wall are formed integrally; and an angle $\theta 2$ of an inner surface of said at least one standing wall with respect to an optical axis of said lens means is larger than an angle θ1 of the deflected beam at the end of said lens means and the optical axis of said lens means.

32. The optical scanning optical system as claimed in claim 31 wherein an incident surface of said lens means comprises a concave surface comprising a toroidal surface.

33. An image forming apparatus comprising:

the optical scanning optical system claimed in claim 31, disposed so as to face a surface to be scanned; and optical deflector means for deflecting a laser beam so as to cause it to scan said surface to be scanned through said optical scanning optical system.

34. An optical scanning optical system comprising:

lens means for converging a deflected beam onto a surface to be scanned;

reinforcement means for reinforcing said lens means; and at least one standing wall projecting from either one of both ends along the longitudinal direction of said lens means in a beam exit direction, wherein said lens means, reinforcement means and at least one, standing wall are formed integrally; and an inner surface of said at least one standing wall is inclined with respect to a plane perpendicular to a deflection plane formed by a deflected beam incident on said lens means being deflected by optical deflector means.

35. The optical scanning optical system as claimed in claim 34 wherein an incident surface of said lens means comprises a concave surface comprising a toroidal surface.

36. An image forming apparatus comprising:

the optical scanning optical system claimed in claim 34, disposed so as to face a surface to be scanned; and optical deflector means for deflecting a laser beam so as to cause it to scan said surface to be scanned through said optical scanning optical system.

37. An optical writing device comprising:

a plurality of light source means;

optical deflector means for deflecting optical beams generated by said plurality of light source means in two symmetrical directions;

optical system means disposed in said two symmetrical direction with respect to said optical deflector means for directing the optical beams deflected by said optical deflector means into respective surfaces to be scanned, and forming images thereon; and housing means containing said plurality of light source means, optical deflector means and optical system means, wherein said housing means comprises a base plate on which said optical deflector means and optical system means are disposed, and a side wall part surrounding said base plate;

said base plate divides said housing means into two sections;

said plurality of light source means are disposed on said side wall part; and optical components of said optical system means are distributed into said two sections of said housing means;

wherein said optical system means comprises an optical scanning lens which comprises:

lens means converging the deflected beam onto the surface to be scanned;

reinforcement means reinforcing said lens means; and at least one standing wall projecting from either one of both ends along the longitudinal direction of said lens means in a beam exit direction, wherein said lens means, reinforcement means and at least one standing wall are formed integrally; and an inner surface of said at least one standing wall is inclined with respect to a plane perpendicular to a deflection plane formed by the deflected beam incident on said lens means being deflected by said optical deflector means.

* * * * *